United States Patent
Dutta et al.

(10) Patent No.: US 10,909,144 B1
(45) Date of Patent: Feb. 2, 2021

(54) TAXONOMY GENERATION WITH STATISTICAL ANALYSIS AND AUDITING

(71) Applicant: Amazon Technologies, Inc., Seattle, WA (US)

(72) Inventors: Archiman Dutta, Bellevue, WA (US); Shoubhik Bhattacharya, Seattle, WA (US); Deepak Kumar Nayak, Seattle, WA (US); Avik Sinha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 788 days.

(21) Appl. No.: 14/640,974

(22) Filed: Mar. 6, 2015

(51) Int. Cl.
*G06F 16/28* (2019.01)
*G06F 16/242* (2019.01)

(52) U.S. Cl.
CPC .......... *G06F 16/285* (2019.01); *G06F 16/244* (2019.01); *G06F 16/282* (2019.01)

(58) Field of Classification Search
CPC ............................. G06F 16/285; G06F 16/282
USPC ......................................................... 707/778
See application file for complete search history.

(56) References Cited

U.S. PATENT DOCUMENTS

| | | | |
|---|---|---|---|
| 6,701,333 B2 | 3/2004 | Suermondt et al. | |
| 7,809,672 B1 | 10/2010 | Tenorio | |
| 7,809,723 B2 | 10/2010 | Liu et al. | |
| 8,266,003 B1 | 9/2012 | Mirchandani et al. | |
| 8,321,455 B2 | 11/2012 | Warner et al. | |
| 8,423,489 B2 | 4/2013 | Johnson et al. | |
| 8,630,915 B1* | 1/2014 | Mirchandani | G06Q 30/0601 705/26.1 |
| 9,251,244 B1* | 2/2016 | Rajaraman | G06F 17/30477 |
| 9,336,302 B1* | 5/2016 | Swamy | G06F 16/2465 |
| 2005/0065955 A1* | 3/2005 | Babikov | G06F 17/30607 |
| 2007/0250487 A1* | 10/2007 | Reuther | G06F 17/30705 |
| 2007/0271146 A1 | 11/2007 | Nordmark et al. | |
| 2008/0154873 A1* | 6/2008 | Redlich | G06F 17/30864 |
| 2009/0204547 A1* | 8/2009 | Rowan | G06Q 30/06 705/80 |
| 2011/0302167 A1* | 12/2011 | Vailaya | G06Q 30/0601 707/737 |

(Continued)

OTHER PUBLICATIONS

U.S. Appl. No. 14/670,259, filed Mar. 26, 2015, Archiman Dutta.

*Primary Examiner* — Joshua Bullock
(74) *Attorney, Agent, or Firm* — Robert C. Kowert; Kowert, Hood, Munyon, Rankin & Goetzel, P.C.

(57) ABSTRACT

Methods, systems, and computer-readable media for taxonomy generation with automated analysis and auditing are disclosed. A primary classification is determined for a hierarchical taxonomy of items in a marketplace. The primary classification is selected from a plurality of terms describing items in the marketplace, and the primary classification is selected based at least in part on automated analysis of the terms. A plurality of secondary classifications are determined for the hierarchical taxonomy. The secondary classifications are selected from the terms describing the items in the marketplace, and the secondary classifications are selected based at least in part on automated analysis of the terms. The hierarchical taxonomy is modified based at least in part on feedback from a plurality of users. The feedback comprises one or more terms entered by one or more of the users to filter a set of items.

19 Claims, 10 Drawing Sheets

(56) References Cited

U.S. PATENT DOCUMENTS

| | | | | |
|---|---|---|---|---|
| 2013/0013603 A1* | 1/2013 | Parker | ............... | G06F 17/3071 707/737 |
| 2014/0379616 A1* | 12/2014 | Sun | ................... | G06Q 10/101 706/11 |
| 2015/0046300 A1* | 2/2015 | Menipaz | ........... | G06F 17/30598 705/28 |

* cited by examiner

TAXONOMY GENERATION WITH STATISTICAL ANALYSIS AND AUDITING

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide online marketplaces that offer goods and/or services for sale to consumers. Consumers may visit a marketplace website to view and/or purchase goods and services offered for sale by the merchant operating the website (and/or third-party merchants). Some online marketplaces include large online catalogs of items offered for sale. For an item offered for sale, an online marketplace typically include a product detail page (e.g., a web page) that specifies various information about the item, such as a description of the item, one or more pictures of the item, as well as specifications (e.g., weight, dimensions, capabilities) of the item. Additionally, an online marketplace may offer other types of pages to potential customers, such as a home page that introduces a customer to the marketplace and a search page that lists products relevant to one or more search terms.

The catalog of items may be organized using a hierarchical classification system, otherwise referred to as a "hierarchical taxonomy" or simply "taxonomy." Generally speaking, a hierarchical classification system is a classification system in which items are arranged based on some hierarchical structure. If the hierarchical structure is a tree, each node of the tree may represent a different classification. An individual item may be classified by placing the item in one of the various leaves of the tree, in one of the branches, or even in the root. From the root through the branches to the leaves, the nodes may represent increasing degrees of specificity in the classification scheme. A well-known example of a hierarchical classification system is the taxonomic system used in modern biology, where the major taxonomic ranks include: kingdom, phylum, class, order, family, genus, and species. Another example of a hierarchical classification system is a product classification scheme used by an online merchant. For a system maintained by an online merchant, the classification of products into a hierarchy of classifications may permit customers to find desired categories of products by navigating up or down the hierarchy.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for taxonomy generation with automated analysis and auditing are described. Using the techniques described herein, a hierarchical taxonomy of items (e.g., items in a product catalog for an online marketplace) may be generated using automated techniques. In one embodiment, descriptive terms associated with items in the catalog may be subjected to statistical analysis, e.g., to determine the relative frequency of such terms. Classifications in the hierarchical taxonomy may be generated based on the descriptive terms, and the classifications may be ordered from generic to specific based on the statistical analysis. The hierarchical taxonomy may also be refined using feedback from users, auditors, or other humans. For example, if users enter many additional terms in order to filter the items in a particular grouping, then the hierarchical taxonomy may be modified to narrow one or more related classifications; likewise, if users enter few terms or no terms in order to filter the items in a particular grouping, then the hierarchical taxonomy may be modified to broaden one or more related classifications. Additional techniques may be used to reduce audit fragmentation and/or partition items into appropriate item groupings. In this manner, a hierarchical taxonomy of items may be generated and maintained efficiently.

Figure 1:
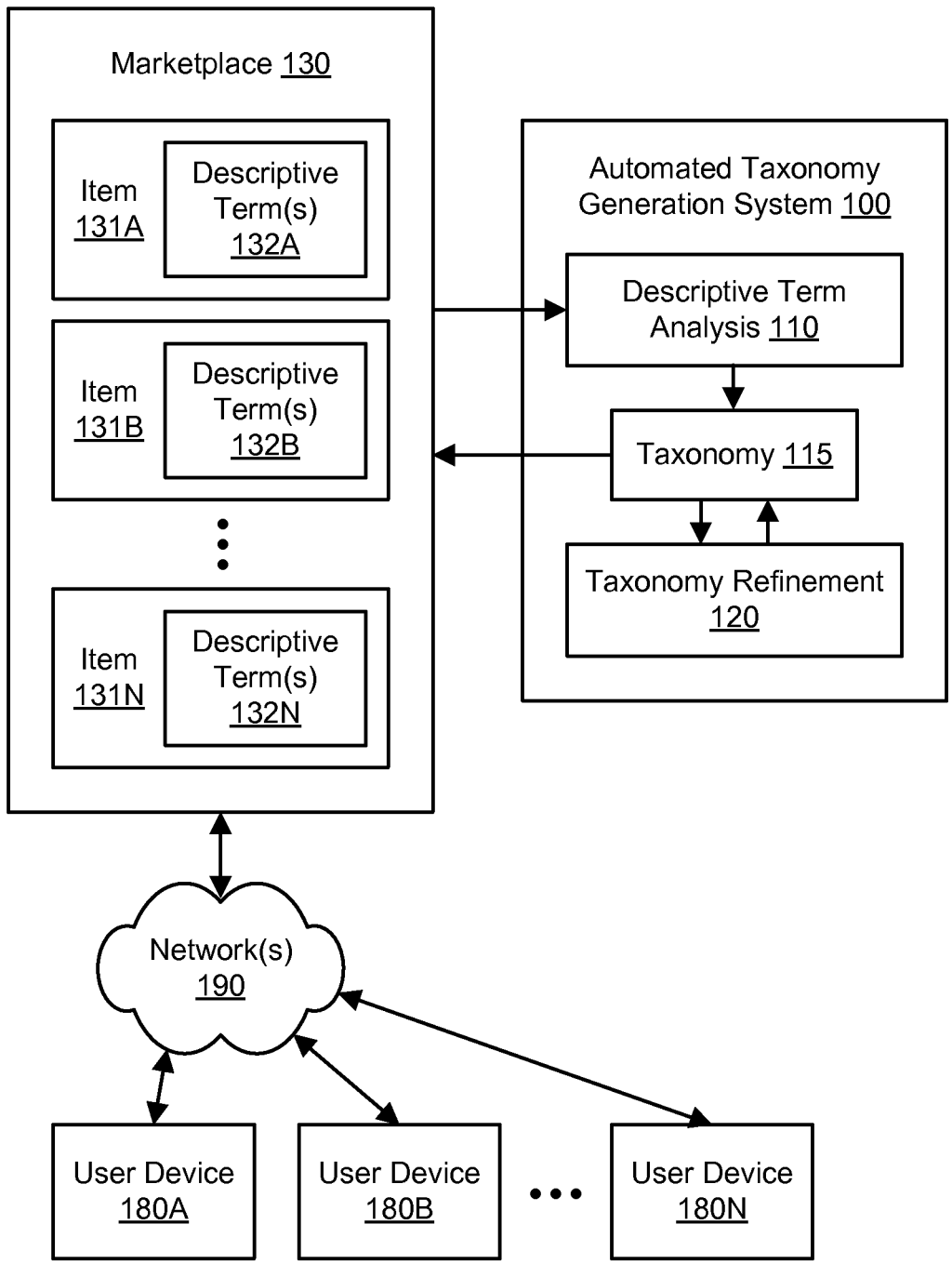
FIG. 1 illustrates an example system environment for taxonomy generation with automated analysis and auditing, according to one embodiment.

FIG. 1 illustrates an example system environment for taxonomy generation with automated analysis and auditing, according to one embodiment. The example system environment may comprise an automated taxonomy generation system 100 that generates a taxonomy 115 of items for a marketplace 130. The taxonomy 115 may include a hierarchical classification scheme, such as a tree-like data structure with a plurality of linked nodes, in which individual items can be classified at particular nodes. As shown for purposes of illustration and example in FIG. 1, three items 131A, 131B, and 131N are included in the marketplace 130. However, it is contemplated that the marketplace 130 may include any suitable number and type of items. The items 131A-131N may comprise goods, services, and/or other products that may be offered to customers by one or more merchants.

The automated taxonomy generation system 100 may include various components, modules, or other functionalities such as a descriptive term analysis functionality 110 and a taxonomy refinement functionality 120. As will be discussed in greater detail below, the descriptive term analysis functionality 110 may generate one or more classifications in the taxonomy 115 based on automated analysis of descriptive terms associated with one or more of the items 131A-131N. As will be discussed in greater detail below, the taxonomy refinement functionality 120 may modify one or more of the classifications in the taxonomy 115, e.g., based on feedback automatically obtained from one or more auditors, customers, or other humans. The descriptive term analysis functionality 110 and taxonomy refinement functionality 120 may be used a plurality of times, e.g., periodically or continuously, to keep the taxonomy 115 updated in an efficient manner. By generating and maintaining a taxonomy 115 that permits customers to find marketplace items quickly and efficiently, the automated taxonomy generation system 100 may improve sales for one or more merchants using the marketplace 130 to interact with customers.

In one embodiment, each of the items 131A-131N may be associated with a set of descriptive terms in the marketplace 130. As shown in the example of FIG. 1, the item 131A may be associated with one or more descriptive terms 132A, the item 131B may be associated with one or more descriptive terms 132B, and the item 131N may be associated with one or more descriptive terms 132N. The descriptive terms 132A-132N may be stored using any suitable techniques for organizing and storing data and/or metadata. The descriptive terms 132A-132N may include the titles for one or more of the corresponding items 131A-131N, the descriptions for one or more of the corresponding items 131A-131N, and/or any other suitable data or metadata. The descriptive terms 132A-132N may include any suitable words or phrases (e.g., expressed in a natural language) to describe or characterize aspects of the corresponding items 131A-131N. For example, if the items 131A-131N include items of clothing, then the descriptive terms may include terms characterizing the type of clothing as well as terms characterizing particular varieties (e.g., by color) or indicating particular brands. The descriptive terms 132A-132N may be supplied by the entity that operates the marketplace 130, by additional merchants that add individual items to the marketplace, by one or more manufacturers of the items 131A-131N, by one or more distributors of the items 131A-131N, and/or by one or more customers of the marketplace 130.

The descriptive term analysis functionality 110 may generate an entire taxonomy 115 or merely a portion of the taxonomy 115, e.g., one or more subtrees. Individual nodes in the taxonomy 115 may be referred to as "classifications."

In one embodiment, the classifications may be selected from the descriptive terms 132A-132N. Statistical analysis of the descriptive terms 132A-132N may be used to select one or more of the descriptive terms to generate a particular classification. In one embodiment, only a portion of the descriptive terms 132A-132N may be used for the analysis; for example, only the first few words of an item's full description may be used. In one embodiment, the statistical analysis may include determining the frequency count of various terms and selecting one or more terms based on the relative frequency counts. For example, a term having a relatively high count may be selected as a high-level classification, and terms having lower counts may be selected for lower-level classifications. From the root node to branch nodes to leaf nodes, the taxonomy may be organized from more generic classifications to more specific classifications. An example of a taxonomy is discussed below with respect to FIG. 3.

Figure 10:
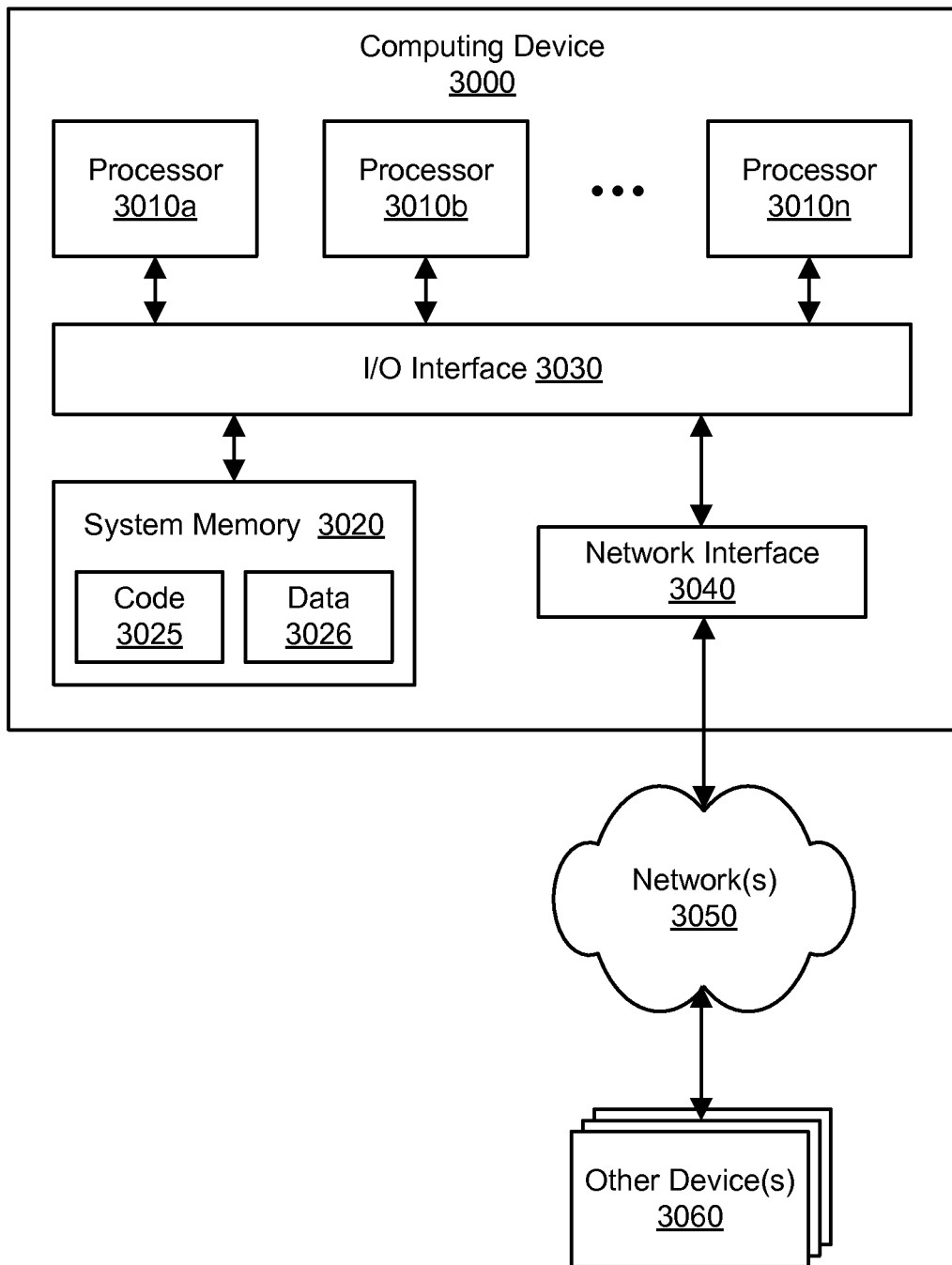
FIG. 10 illustrates an example computing device that may be used in some embodiments.

The automated taxonomy generation system 100 and marketplace 130 may be implemented using any suitable number and configuration of computing devices, any of which may be implemented by the example computing device 3000 illustrated in FIG. 10. The computing devices may be located in any suitable number of data centers or geographical locations. In various embodiments, the functionality of the different components of the automated taxonomy generation system 100 and marketplace 130 may be provided by the same computing device or by different computing devices. If any of the components of the automated taxonomy generation system 100 and marketplace 130 are implemented using different computing devices, then the components and their respective computing devices may be communicatively coupled, e.g., via network(s) 190. Each of the components of the automated taxonomy generation system 100 and marketplace 130 may represent any combination of software and hardware usable to perform their respective functions, as discussed as follows. Operations implemented by the automated taxonomy generation system 100 and/or marketplace 130 may be performed automatically, e.g., without a need for user initiation or user intervention after an initial configuration stage, and programmatically, e.g., by execution of program instructions on a computing device. It is contemplated that the automated taxonomy generation system 100 and/or marketplace 130 may include additional components not shown, fewer components than shown, or different combinations, configurations, or quantities of the components shown.

Relevant items from the marketplace 130 may be automatically classified into suitable nodes (i.e., classifications) in the taxonomy 115, e.g., based on the descriptive terms associated with the items. The taxonomy 115 may then be made available to customers of the marketplace 130 so that the customers may quickly and efficiently navigate the taxonomy to find items of interest. The automated taxonomy generation system 100 and/or marketplace 130 may be operated by or on behalf of an internet-based merchant or other online entity. The items 131A-131N may be listed on the marketplace 130 by the merchant who operates the marketplace and/or by additional "third party" merchants. In one embodiment, the marketplace 130 may generate various types of web pages that permit customers to search for items in a product catalog, browse product categories (e.g., as determined using the automated taxonomy generation system 100), view detailed information for particular items, purchase particular items, or engage in other types of transactions with a merchant. For example, the marketplace may generate, for a particular user of the marketplace, an interactive page that includes data indicative of a set of items in one of the classifications of the taxonomy 115. The term "page" or "web page" is intended to include any suitable types of code and/or data for implementing a structured multimedia format (e.g., including text and/or graphics) that is displayable in a browser program. The term "interactive page" indicates that the user may enter input into a page to modify the display in the browser program, such as to drill down from a list of marketplace items to a particular item, engage in a transaction with a merchant related to an item, or navigate to another portion of the taxonomy 115.

Customers may interact with the marketplace 130 using a plurality of user devices such as user devices 180A, 180B, and 180N. As used herein, the term "customer" is intended to include entities that have previously engaged in transactions with a merchant or other entity (e.g., for the sale or lease of goods and/or services) and also entities that may potentially engage in such transactions in the future. Although three user devices 180A, 180B, and 180N are shown for purposes of illustration and example, it is contemplated that any suitable number and configuration of user devices may interact with the marketplace 130. The user devices 180A-180N may be coupled to the marketplace 130 using one or more networks 190, such as the internet. The user devices 180A-180N may be implemented using any suitable number and configuration of computing devices, any of which may be implemented by the example computing device 3000 illustrated in FIG. 10.

Figure 2:
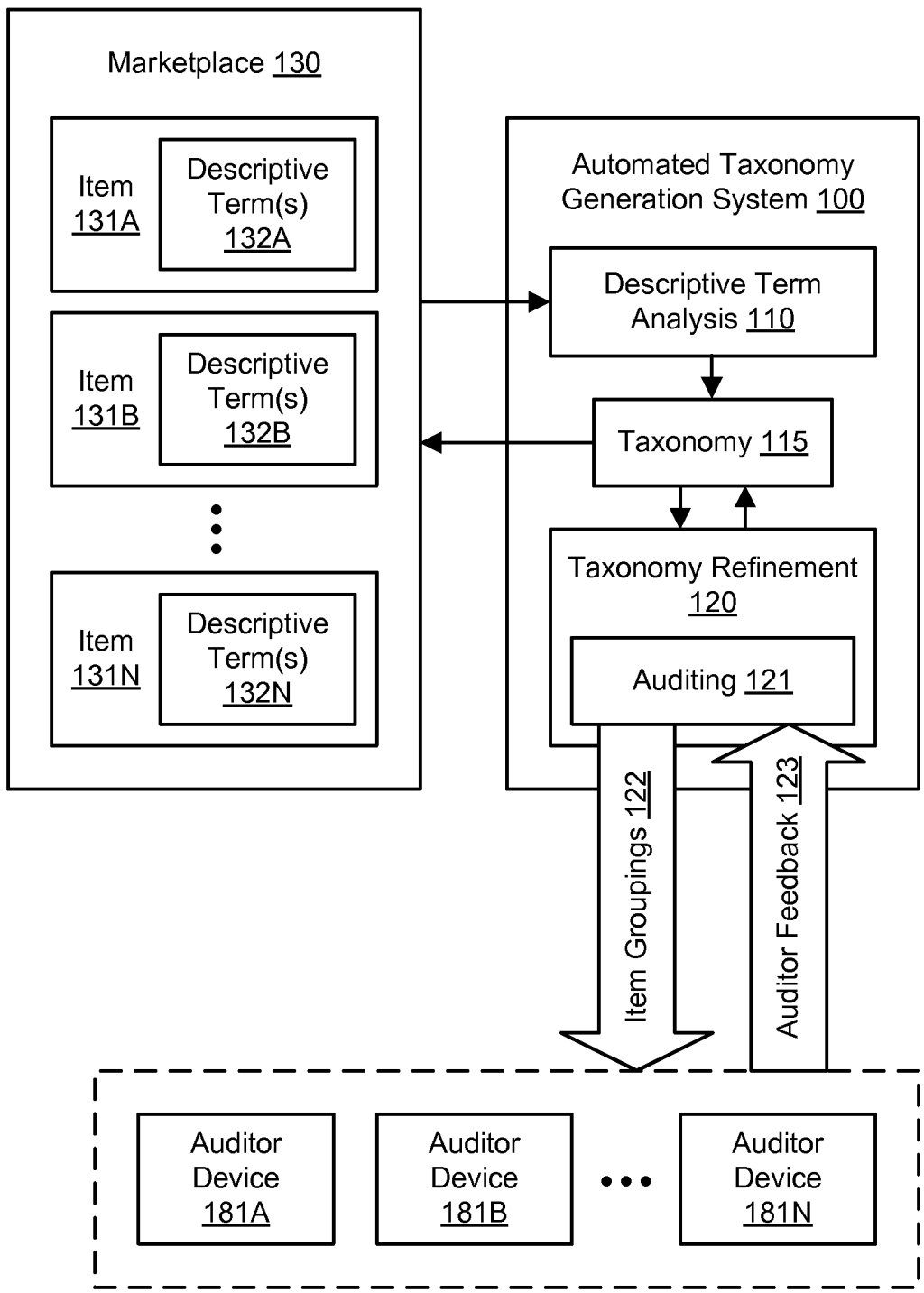
FIG. 2 illustrates further aspects of the example system environment for taxonomy generation with automated analysis and auditing, including auditing by multiple auditors, according to one embodiment.

FIG. 2 illustrates further aspects of the example system environment for taxonomy generation with automated analysis and auditing, including auditing by multiple auditors, according to one embodiment. The taxonomy refinement functionality 120 may modify one or more of the classifications in the taxonomy 115. In one embodiment, the taxonomy refinement functionality 120 may include an auditing functionality 121. Using the auditing functionality 121, one or more item groupings 122 may be provided to one or more auditors. In the auditing process, the auditors may provide input as to how they think items should be grouped. The taxonomy 115 may be modified based on feedback 123 obtained from the one or more auditors. As used herein, the term "auditors" may include human auditors who are engaged (e.g., by an entity that operates the automated taxonomy generation system 100 and/or marketplace 130) to provide feedback 123 on item groupings, e.g., individuals who are paid to do so. As used herein, the term "auditors" may also include customers or other users, e.g., customers of the marketplace 130, who may provide feedback 123 on the taxonomy 115 and/or item groupings either knowingly or unknowingly.

The auditors may interact with the auditing functionality 121 using one or more auditor devices 181A, 181B, and 181N. Although three auditor devices 181A, 181B, and 181N are shown for purposes of illustration and example, it is contemplated that any suitable number and configuration of auditor devices may interact with the auditing functionality 121. The auditor devices 181A-181N may be coupled to the automated taxonomy generation system 100 using the one or more networks 190, such as the internet. The auditor devices 181A-181N may be implemented using any suitable number and configuration of computing devices, any of which may be implemented by the example computing device 3000 illustrated in FIG. 10.

In one embodiment, the auditing functionality 121 may present one or more of the item groupings 122 to a particular one of the auditors. Each of the item groupings may include a set of items (e.g., a selection from the items 131A-131N) that are characterized by one or more of the descriptive terms 132A-132N. For example, an item grouping for the term "jeans" may include many items that include "jeans" in their descriptive terms. In one embodiment, the one or more item groupings may vary for individual auditors, such that some auditors may be presented different item groupings than other auditors. The item groupings may be presented in any suitable manner, such as by sending the auditor a web page for one or more item groupings that indicates the descriptive term(s) of the item grouping(s) and lists the item(s) within the grouping(s). Accordingly, the auditor devices 181A-181N may include web browsers or other client applications suitable for examining the item groupings 122 and/or providing the auditor feedback 123.

In one embodiment, the browser or other application may display a particular item grouping, potentially including both the items and the descriptive term(s) for the grouping, to an auditor. In one embodiment, the auditor may enter one or more additional terms in order to filter the item grouping, e.g., to reduce the quantity of items. For example, if the classification relates to a particular type of clothing, an auditor may enter additional descriptive terms relating to the color or brand of the clothing in an attempt to obtain a narrower set of products. The additional terms entered by the auditors may be included in the auditor feedback 123 sent by the auditor devices 181A-181N to the auditing functionality 121. In one embodiment, the auditor feedback 123 may also indicate the absence of any additional terms entered by the auditors for one or more classifications. In one embodiment, the auditor may select one or more of the classifications from the taxonomy 115 or otherwise assign individual items in an item grouping to classifications in the taxonomy. The selected classification(s) may may be included in the auditor feedback 123 sent by the auditor devices 181A-181N to the auditing functionality 121. In general, the auditor feedback 123 may include one or more item grouping definitions as determined by the auditor(s).

The taxonomy refinement functionality 120 may use the auditor feedback 123 to modify or refine one or more classifications in the taxonomy 115. For example, if the auditors entered many additional terms for a particular item grouping, then the taxonomy refinement functionality 120 may determine that the particular item grouping is overly broad and take appropriate action to modify the taxonomy, e.g., by narrowing a particular classification related to the descriptive term(s) of the item grouping. Likewise, if the auditors entered no additional terms for a particular item grouping, then the taxonomy refinement functionality 120 may determine that the particular item grouping is overly narrow and take appropriate action to modify the taxonomy, e.g., by broadening or eliminating a particular classification related to the descriptive term(s) of the item grouping. In one embodiment, descriptive terms may be assigned weights based on the feedback 123, and the weights may be used to determine the relative importance of the terms in a modified version of the hierarchical taxonomy. The taxonomy refinement functionality 120 may thus be used to modify a substantial portion of the taxonomy 115, e.g., by repeating the process of generating classifications beginning from a primary classification or higher-level node.

Modification or refinement of a classification in the taxonomy 115 may include broadening the classification (e.g., to include a larger quantity of items), narrowing the classification (e.g., to include a smaller quantity of items), changing the parent node of the classification, changing one or more child nodes of the classification, eliminating the classification from the taxonomy, or any other suitable alteration. Modification or refinement of a classification in the taxonomy 115 may also include adding one or more terms to the classification (e.g., as selected from the descriptive terms 132A-132N and/or auditor feedback 123), eliminating one or more terms from the classification, or otherwise altering one or more terms in the classification. Examples of refined taxonomies are discussed below with respect to FIG. 4 and FIG. 5.

Figure 3:
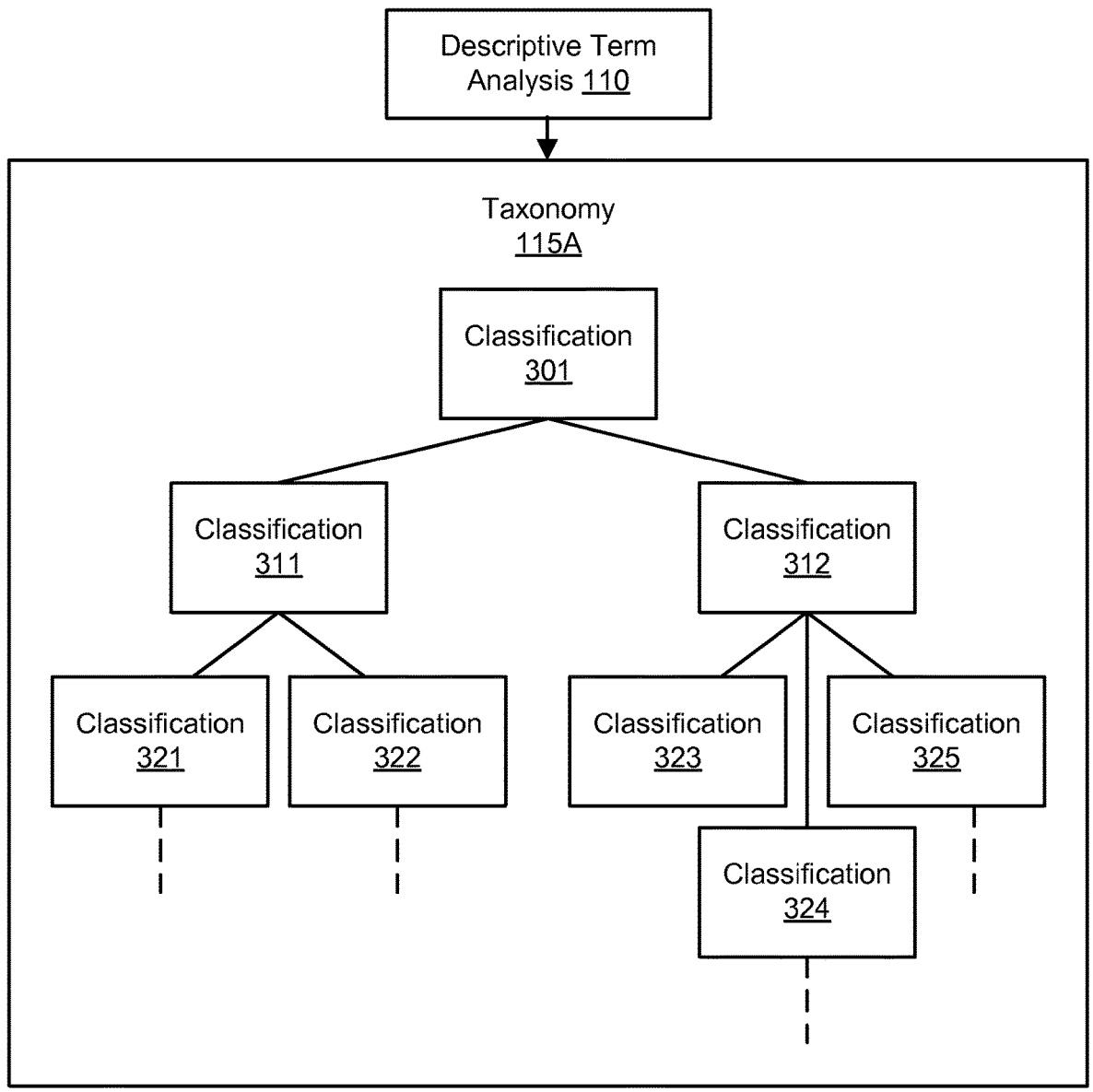
FIG. 3 illustrates an example of a taxonomy generated with automated analysis of descriptive terms, according to one embodiment.

FIG. 3 illustrates an example of a taxonomy generated with automated analysis of descriptive terms, according to one embodiment. The example taxonomy 115A may be stored and maintained in any suitable data structure (e.g., a tree) using any suitable storage technology. The taxonomy 115A may comprise a plurality of nodes that are connected by edges or links. Each node may represent a particular classification, and each edge or link may represent a parent-child relationship. Although a particular number and configuration of classifications is shown for purposes of illustration in FIG. 3, it is contemplated any suitable number and configuration of classifications may be used with the systems, methods, and computer-readable media described herein. The classifications may represent categories of items offered for sale in the marketplace 130. In order of more general to more specific item categories, the taxonomy 115A may comprise a classification 301 at a root node at a first level; classifications 311 and 312 at branch nodes at a second level; classifications 321, 322, 324, and 325 at branch nodes at a third level; and classification 323 at a leaf node at the third level. As indicated by the dotted lines, the taxonomy 115A may include additional levels of nodes (and their corresponding classifications) beneath the branch nodes corresponding to classifications 321, 322, 324, and 325. The highest level classification 301 may also be referred to a primary classification, the next level classifications 311 and 312 as secondary classifications, and the remaining classifications 321, 322, 323, 324, and 325 as secondary or tertiary classifications. In one embodiment, the classification 301 may represent the broadest category of items offered in the marketplace 130. In one embodiment, the classification 301 may instead be a narrower category and may represent a root node of a subtree of a larger taxonomy; accordingly, the node corresponding to the classification 301 may have a parent node that represents a broader category.

Using the descriptive term analysis functionality 110, the classifications 301-325 may be selected from a set of descriptive terms describing a set of items in the marketplace 130. For example, the set of items for which the taxonomy 115A is generated may generally include a variety of clothing items, particularly jeans or other denim-based trousers. In the descriptive terms, the most frequently appearing terms may include "jeans," "blue," "women's," "men's," and various terms indicating specific varieties (e.g., types of cut or fit) and brands of jeans. Automated statistical analysis may take the set of descriptive terms and determine that "jeans" is the most important of the terms. The automated analysis may determine the importance of terms based on their relative frequency count among the plurality of terms. For example, one or more terms that are determined to have a higher relative frequency count may be deemed more important than one or more terms that are determined to have a lower relative frequency count. Accordingly, the classification 301 may be generated based on the term "jeans." The automated statistical analysis may then determine that "women's" and "men's" are the next most important terms. The classifications 311 and 312 may be generated based on the terms "women's" and "men's," respectively. The classifications 321 and 322 may be generated based on the most frequently appearing terms that indicate particular varieties of women's jeans, and the classifications 323, 324, and 325 may be generated based on the most frequently appearing terms that indicate particular varieties of and men's jeans. From the root node to branch nodes to leaf nodes, the classifications in the taxonomy 115A may be ordered from generic to specific, as determined using the descriptive term analysis functionality 110.

A generic, higher-level classification may capture most of the variance of features within its set, and within each selected feature, the features with the highest variance may be selected for the next level of classification. As used herein, the term "variance" generally indicates a difference from extremes, e.g., a difference from zero or one for normalized values for the frequency count of terms. For terms whose frequency count is below 0.5 (normalized to a range between zero and one), the difference may be determined relative to zero; For terms whose frequency count is above 0.5 (normalized to a range between zero and one), the difference may be determined relative to one. In one embodiment, the statistical analysis may use a suitable clustering algorithm to choose the most generic term from the set of terms and then choose a next level of classifications based on terms that have the highest degree of variance. For example, for a set of a hundred items, fifty may be characterized by the terms "jeans" and "women's" while another fifty may be characterized by the terms "jeans" and "men's." The statistical analysis may select the term "jeans" as the most important feature and create a cluster for that term. The statistical analysis may then determine that "women's" and "men's" have the highest variance (and importance) within the "jeans" cluster. The variance (and importance) may be based on the normalized frequency count of the terms relative to zero or one. In this manner, classifications in the taxonomy 115A may be generated level by level, from most important and most generic to least important and more specific.

Figure 4:
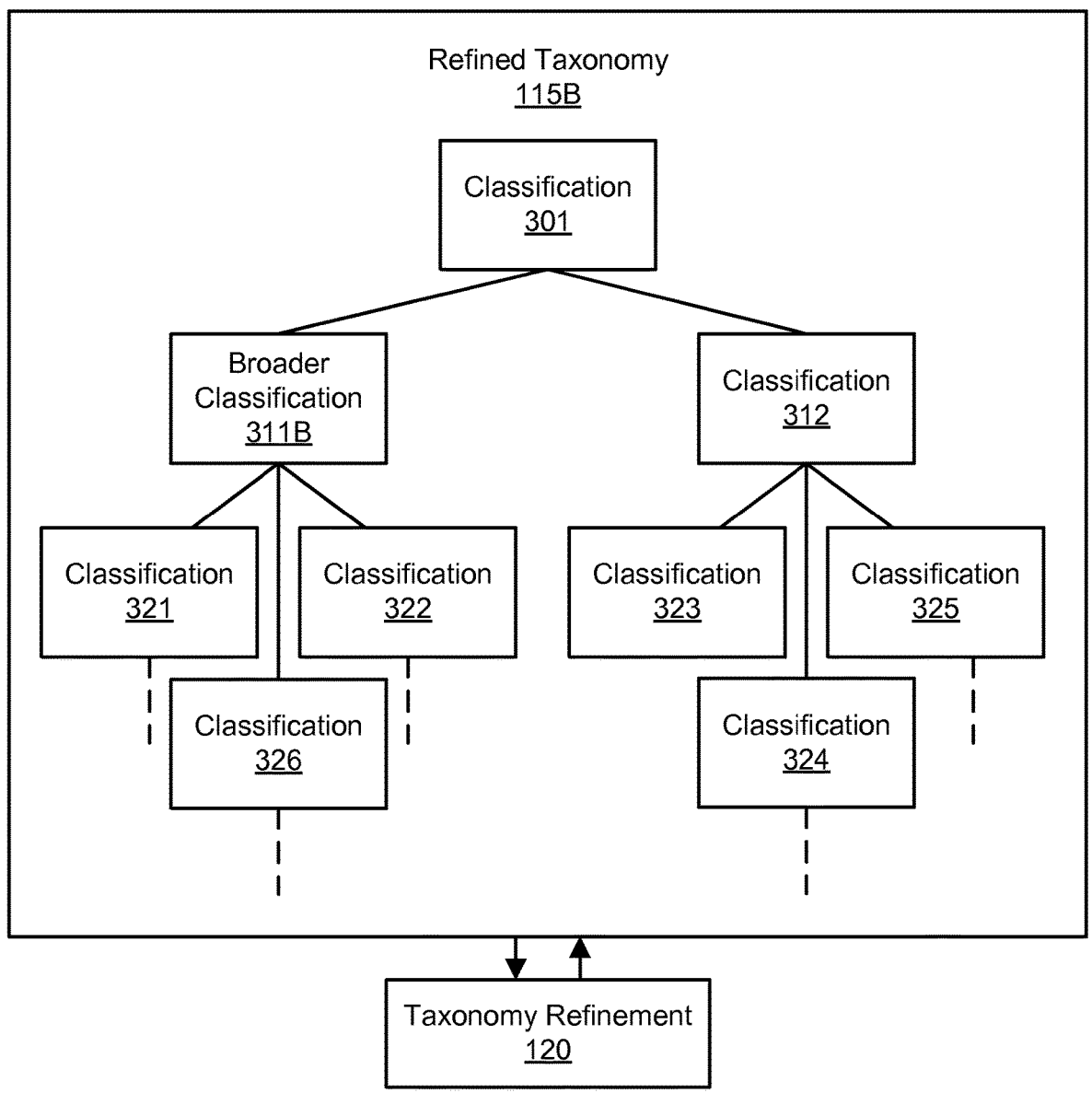
FIG. 4 illustrates a refinement to the example taxonomy to broaden a classification based on auditor feedback, according to one embodiment.

FIG. 4 illustrates a refinement to the example taxonomy to broaden a classification based on auditor feedback, according to one embodiment. The example taxonomy 115B may represent a modified version of the example taxonomy 115A. Although a particular number and configuration of classifications is shown for purposes of illustration in FIG. 4, it is contemplated any suitable number and configuration of classifications may be used with the systems, methods, and computer-readable media described herein. As discussed above, auditor feedback may be collected using the taxonomy refinement functionality 120. The feedback may be collected from auditors, potentially including customers of the marketplace. The feedback may include terms entered to filter items in one or more item groupings. In one embodiment, the feedback may also indicate if no terms were entered to filter items in one or more of the item groupings.

As shown in the example of FIG. 4, the hierarchical taxonomy may be modified to include a broader classification 311B based on the auditor feedback. Related to a particular classification such as classification 311, the auditor feedback may include a quantity of terms entered to filter items or may instead indicate that zero terms were entered. If the quantity of terms is zero or is less than a threshold quantity for the classification 311, then the item grouping and related classification 311 may be deemed to be excessively narrow. The taxonomy may be modified to include the broader classification 311B based on the narrow classification 311. To generate the broader classification 311B, one or more terms may be removed from the narrow classification 311, or a different one or more terms may be used. In one embodiment, the broader classification 311B may include a larger quantity of items than the narrow classification 311. In one embodiment, the broader classification 311B may include one or more additional child classifications such as classification 326. Other classifications may be moved (e.g., up or down one or more levels), renamed, added, or removed in conjunction with the generation of the broader classification 311B.

Figure 5:
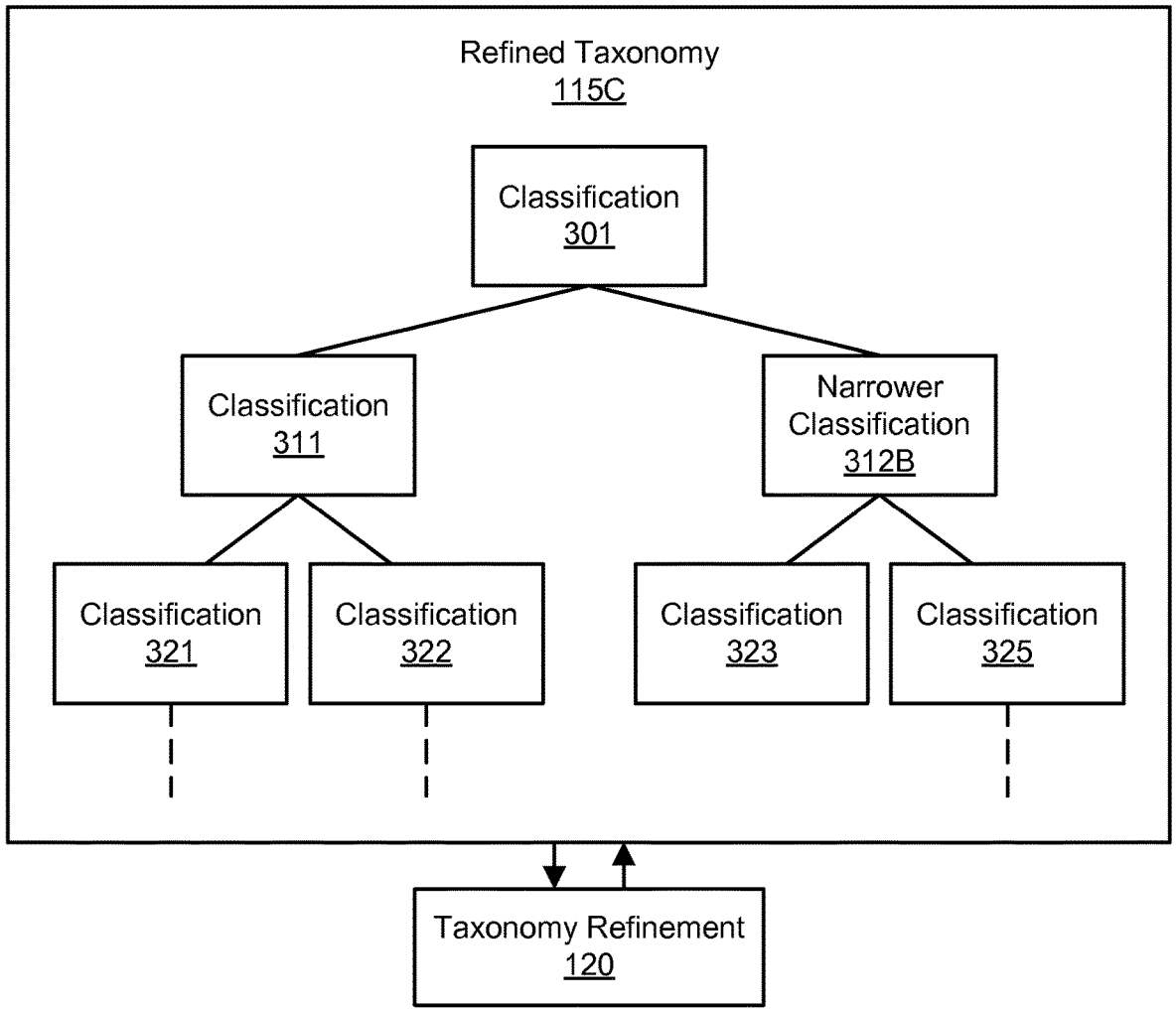
FIG. 5 illustrates a refinement to the example taxonomy to narrow a classification based on auditor feedback, according to one embodiment.

FIG. 5 illustrates a refinement to the example taxonomy to narrow a classification based on auditor feedback, according to one embodiment. The example taxonomy 115C may represent a modified version of the example taxonomy 115A. Although a particular number and configuration of classifications is shown for purposes of illustration in FIG. 5, it is contemplated any suitable number and configuration of classifications may be used with the systems, methods, and computer-readable media described herein. As discussed above, auditor feedback may be collected using the taxonomy refinement functionality 120. The feedback may be collected from auditors, potentially including customers of the marketplace. The feedback may include terms entered to filter items in one or more of the item groupings. In one embodiment, the feedback may also indicate if no terms were entered to filter items in one or more of the item groupings.

As shown in the example of FIG. 5, the hierarchical taxonomy may be modified to include a narrower classification 312B based on the auditor feedback. Related to a particular classification such as classification 312, the auditor feedback may include a quantity of terms entered to filter items. If the quantity of terms is greater than a threshold quantity for the classification 312, then the item grouping and related classification 312 may be deemed to be excessively broad. The taxonomy may be modified to include the narrower classification 312B based on the broad classification 312. To generate the narrower classification 312B, one or more terms may be added to the broad classification 312, or a different one or more terms may be used. In one embodiment, the narrower classification 312B may include a smaller quantity of items than the broad classification 312. In one embodiment, the narrower classification 312B may include one or more fewer child classifications, such as classification 324. Other classifications may be moved (e.g., up or down one or more levels), renamed, added, or removed in conjunction with the generation of the narrower classification 312B.

Figure 6:
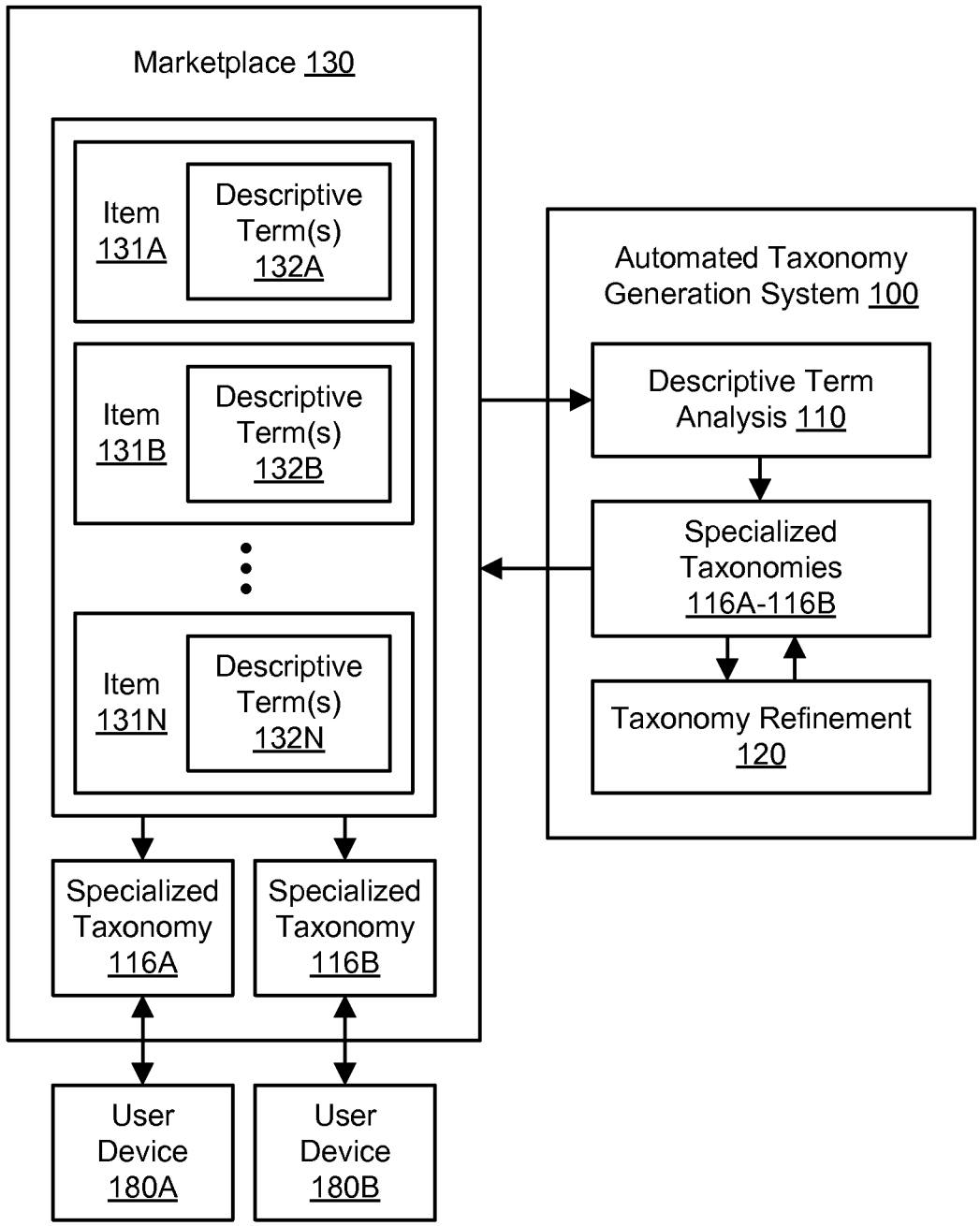
FIG. 6 illustrates further aspects of the example system environment for taxonomy generation with automated analysis and auditing, including the generation of specialized taxonomies, according to one embodiment.

FIG. 6 illustrates further aspects of the example system environment for taxonomy generation with automated analysis and auditing, including the generation of specialized taxonomies, according to one embodiment. In one embodiment, a plurality of specialized taxonomies 116A and 116B may be generated using the descriptive term analysis functionality 110 and/or modified with the taxonomy refinement functionality 120. Although two specialized taxonomies 116A and 116B are shown for purposes of illustration and example, it is contemplated that any suitable number of specialized taxonomies may be generated by the automated taxonomy generation system 100. The specialized taxonomies 116A and 116B may vary from each other in one or more classifications or configuration of the classifications. The specialized taxonomies 116A and 116B may be generated for interaction with different individual customers, different groups of customers, different regions of the marketplace 130, and other relevant sets of customers. For example, taxonomy 116A may be specialized for a set of customers having one characteristic, and taxonomy 116B may be specialized for a set of customers having another characteristic.

In one embodiment, the specialized taxonomies 116A and 116B may be generated from a common taxonomy using the taxonomy refinement functionality 120, e.g., based on feedback from auditors. The specialized taxonomies 116A and 116B may be assigned to particular customers, groups of customers, or marketplace regions based on shared characteristics with the auditors supplying the relevant feedback. The specialized taxonomy 116A may vary from the specialized taxonomy 116B by having one or more broader classifications, one or more narrower classifications, one or more additional classifications, one or more fewer classifications, a different configuration of parent-child relationships among classifications, or any other suitable differences. In one embodiment, the same set of items 131A-131N may be presented to different user devices 180A and 180B using different taxonomies 116A and 116B, respectively. In one embodiment, one of the specialized taxonomies 116A and 116B may present more or fewer items to the corresponding user devices 180A and 180B based on the absence of particular classifications in one of the specialized taxonomies 116A and 116B. For example, some product categories may be excluded from particular groups or users or marketplace regions.

Figure 7:
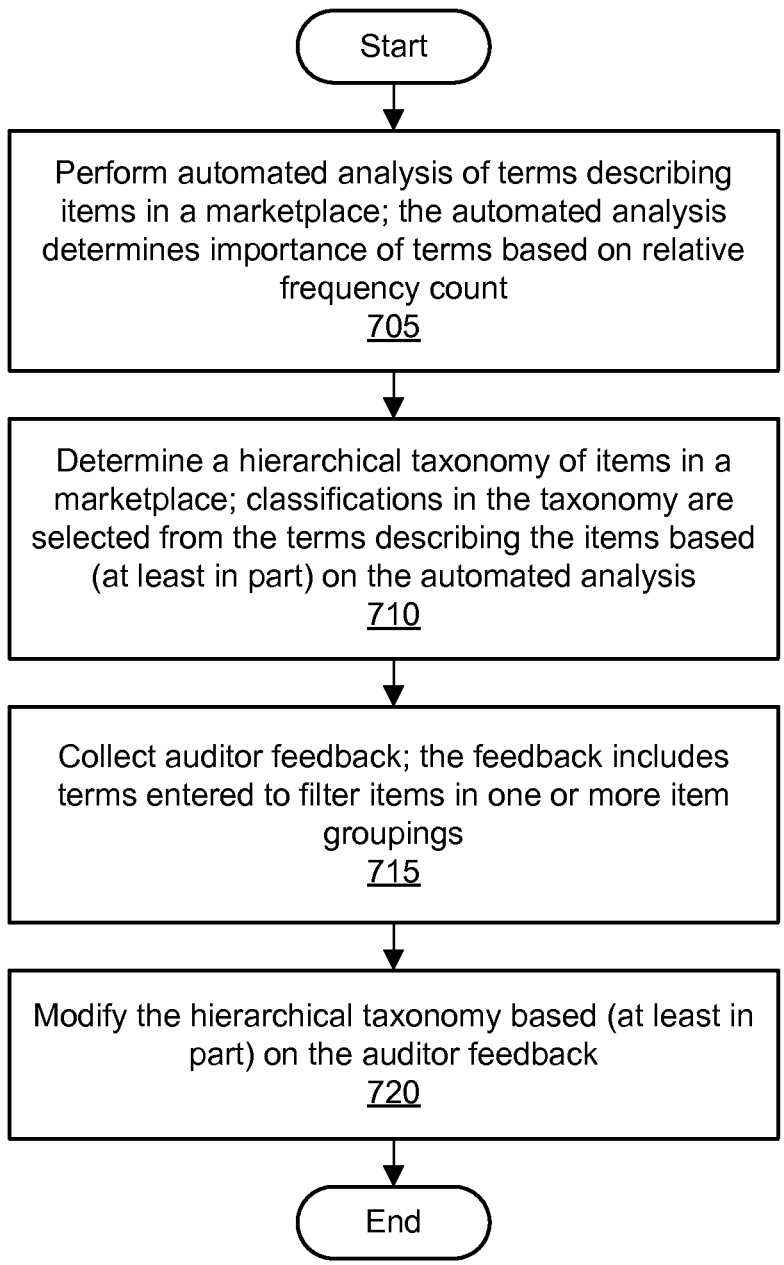
FIG. 7 is a flowchart illustrating a method for taxonomy generation with automated analysis and auditing, according to one embodiment.

FIG. 7 is a flowchart illustrating a method for taxonomy generation with automated analysis and auditing, according to one embodiment. As shown in 705, automated analysis may be performed of terms describing items in a marketplace. The automated analysis may determine the importance of terms based on their relative frequency count among the plurality of terms. For example, one or more terms that are determined to have a higher relative frequency count may be deemed more important than one or more terms that are determined to have a lower relative frequency count.

As shown in 710, a hierarchical taxonomy may be determined for items in a marketplace. The classifications in the taxonomy may be selected from the terms describing the items based (at least in part) on the automated analysis performed in 705. The classifications may include one or more primary (or higher level) classifications and a plurality of secondary (intermediate and/or lower level) classifications. The terms selected for the secondary classifications may occur less frequently than the term(s) selected for the primary classification in the plurality of terms. The secondary classifications may be located beneath the primary classification(s) in the taxonomy, e.g., as child nodes or grand-child nodes (with any suitable number of intermediate nodes), such that the secondary classifications represent more specific categories and the primary classification(s) represent more generic categories. From the root node to branch nodes to leaf nodes, the classifications may be ordered from generic to specific. The secondary classifications may themselves be located at various levels of the taxonomy, such that some of the secondary classifications may be child nodes or grand-child nodes (with any suitable number of intermediate nodes) of others of the secondary classifications.

As shown in 715, auditor feedback may be collected. The feedback may be collected from auditors, potentially including customers of the marketplace. Each auditor may be presented with one or more item groupings, and each item grouping may be defined by one or more descriptive terms. The feedback may include terms entered to filter items in one or more of item groupings. In one embodiment, the feedback may also indicate if no terms were entered to filter items in one or more of the item groupings.

As shown in 720, the hierarchical taxonomy may be modified based (at least in part) on the auditor feedback. For a particular classification related to the descriptive term(s) for an item grouping, the auditor feedback may include a quantity of terms entered to filter items or may instead indicate that zero terms were entered. If the quantity of terms is zero or is less than a threshold quantity for a particular classification, then the particular classification may be deemed to be a narrow classification, and modifying the taxonomy may include generating a broader classification for the taxonomy based (at least in part) on the particular classification. If the quantity of terms is greater than a threshold quantity for a particular classification, then the particular classification may be deemed to be a broad classification, and modifying the taxonomy may include generating a narrower classification for the taxonomy based (at least in part) on the particular classification.

As discussed above, item groupings defined by descriptive terms may be presented to auditors in order to determine whether the item groupings are overly broad or overly narrow. In one embodiment, the classification of items may also be subjected to auditing, e.g., by dedicated auditors. When items are classified automatically, audits may be performed for each source-node-to-suggested-node classification pair. Items to be audited may be grouped into various sets in order to increase the homogeneity and optimize the fragmentation of the item grouping. As used herein, "optimize" means "improve" rather than necessarily "make optimal." To increase the homogeneity of the item grouping, two types of input may be used: the grouping of items by the automated classification scheme and the grouping of items by their original classification in the taxonomy. Increased homogeneity may increase the likelihood of a successful audit if all the samples in an item grouping are similar items without false positives.

Figure 8:
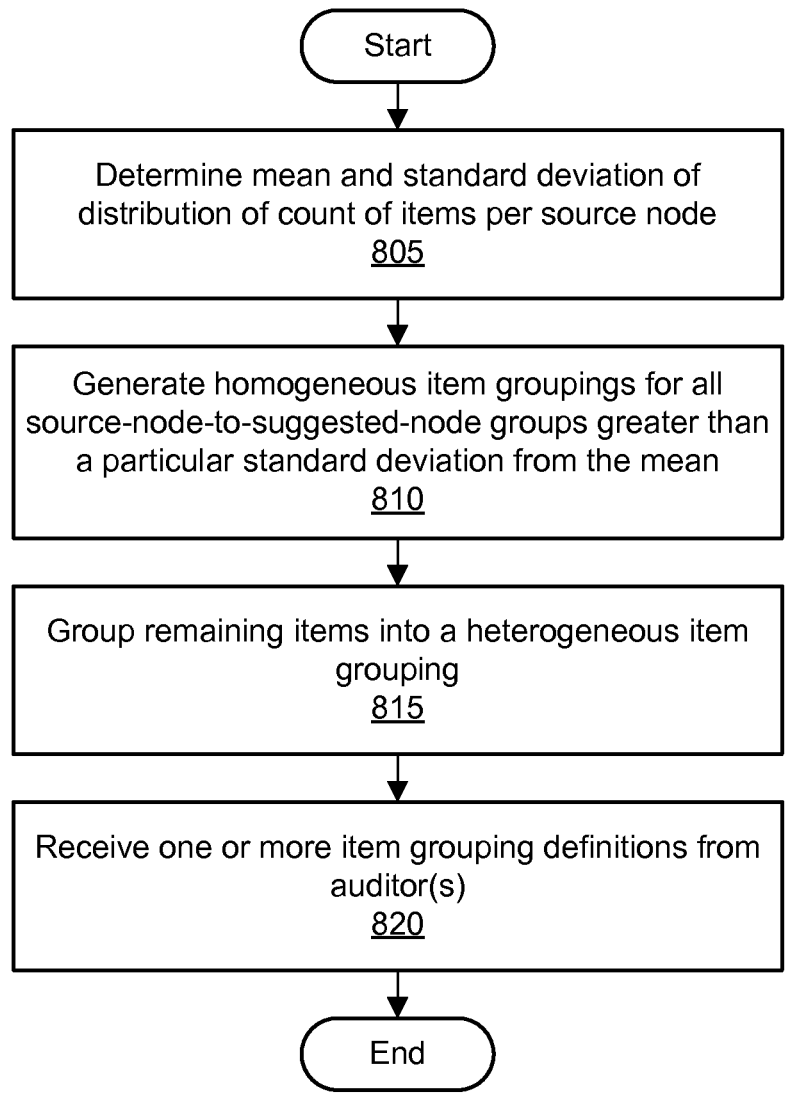
FIG. 8 is a flowchart illustrating a method for optimizing audit grouping, according to one embodiment.

FIG. 8 is a flowchart illustrating a method for optimizing audit grouping, according to one embodiment. In one embodiment, audit grouping may be optimized to reduce fragmentation of item groupings while maintaining homogeneity for most item groupings. As shown in 805, using the distribution of the count of items per source node within the grouping, the mean and standard deviation of the distribution may be determined. Typically, for a catalog of items, a few source nodes may contain most of the items, and a long tail of nodes containing the rest (e.g., misclassifications). As shown in 810, homogeneous item groupings may be generated for all source-node-to-suggested-node groups greater than a tuned number of standard deviations from the mean. As shown in 815, the remaining items may be grouped together into a heterogeneous item grouping regardless of their source node, e.g., only based on the original grouping. The tuning may be automated to maintain a high population-to-audit ratio. As shown in 820, item grouping definitions may be received from one or more auditors after assessing any of the item groupings generated in 810 and 815. The item grouping definitions may include one or more additional descriptive terms to filter one or more item groupings presented to the auditor(s), one or more corrected or alternative item groupings, or any other input usable to define an item grouping based on descriptive terms.

In one embodiment, a pattern-based technique may be used for generating long patterns of terms to which multiple items match. Longer patterns of descriptive terms may correspond to more specific and homogeneous underlying clusters. However, the generation of such patterns to match homogeneous groups of items is expensive and grows in factorial space. The underlying word cloud of a short pattern may be used to automatically generate long patterns of desired homogeneity.

Figure 9:
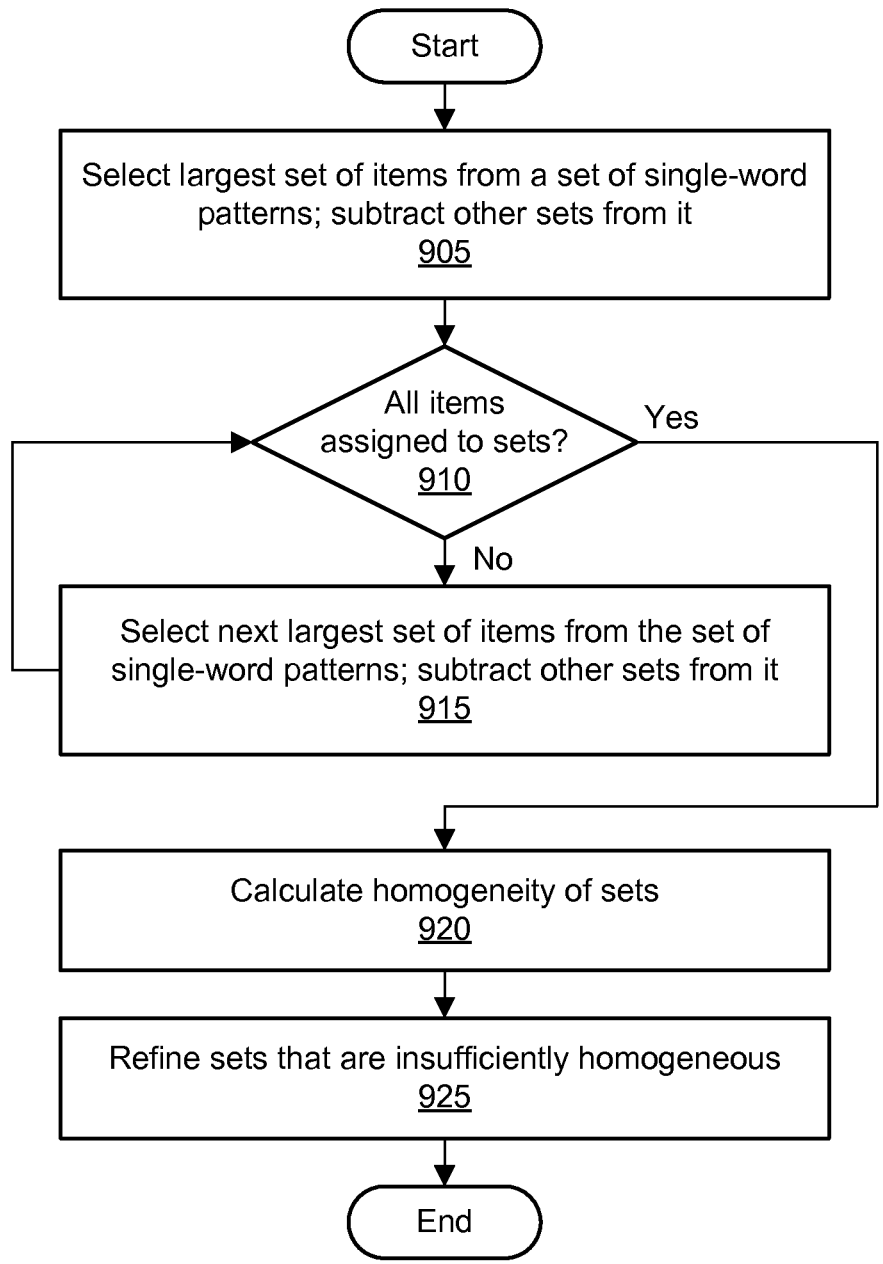
FIG. 9 is a flowchart illustrating a method for item partitioning, according to one embodiment.

FIG. 9 is a flowchart illustrating a method for item partitioning, according to one embodiment. The method shown in FIG. 9 may be used to generate a plurality of item groupings, e.g., for use in the method shown in FIG. 8 and/or in an auditing process discussed with reference to FIG. 2. As shown in 905, for a set of all possible single-word patterns that characterize a set of items, the items may be partitioned by selecting the largest set. All other sets may then be subtracted from it. As shown in 910, it may be determined whether all the items have been assigned to sets. As shown in 915, the next largest remaining set may be selected, and all other sets may then be subtracted from it. As shown in 910 and 915, this process may be repeated until all of the items have been assigned to disjoint sets or partitions.

For each partition, the sets that the largest set consumed in the earlier step may form the word cloud of that set. The distribution may be given by the number of items per set that overlapped with the largest set in the partition. The importance of refining any of these partitions may be estimated or predicted by calculating its homogeneity. As shown in 920, the homogeneity may be calculated by finding the variance around a moment of the distribution of these word cloud sets after normalizing the distribution and then computing variance by replacing the mean in the formula, such that the mean=1 if the cardinality of the word cloud set is >0.5 and the mean=0 if the cardinality of the word cloud set is <0.5. If the computed variance from each extremity is large for a particular partition, then the outer pattern itself is not homogeneous, and it is desirable to explore the inner structure by re-partitioning the data. As shown in 925, sets that are insufficiently homogeneous may be refined. Additional word clouds may not be explored when the variance in the partition drops below a threshold. In one embodiment, the refinement operation shown in 925 may include returning to the operation shown in 905 to refine the particular set(s) that are insufficiently homogeneous. In one embodiment, the refinement operation shown in 925 may include sending the sets as one or more item groupings to auditors to obtain auditor feedback on the item grouping definitions.

In this manner, an optimized homogeneous set of partitions may be created for a given set of items without incurring the cost of generating multiple combinations of words to form all patterns. Accordingly, highly homogeneous groupings of items may be produced. Efficient grouping may be beneficial for activities such as detection and correction of incorrectly categorized items, classification of items into a taxonomy, recommendation of similar items, and detecting top search queries that describe a homogeneous set of items.

Illustrative Computer System

In at least some embodiments, a computer system that implements a portion or all of one or more of the technologies described herein may include a general-purpose computer system that includes or is configured to access one or more computer-readable media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement an automated taxonomy generation system, wherein the automated taxonomy generation system is configured to:
   determine a primary classification for a hierarchical taxonomy of items in a marketplace, wherein the primary classification is selected from a plurality of terms describing a plurality of items in the marketplace, and wherein the primary classification is selected based at least in part on automated statistical analysis of a frequency of occurrence of the plurality of terms;
   determine a plurality of secondary classifications for the hierarchical taxonomy of items in the marketplace, wherein the secondary classifications are beneath the primary classification in the hierarchical taxonomy, wherein the secondary classifications are selected from the plurality of terms describing the plurality of items in the marketplace, wherein the secondary classifications are selected based at least in part on automated statistical analysis of the frequency of occurrence of the plurality of terms, and wherein the secondary classifications occur less frequently than the primary classification in the plurality of terms;
   collect auditor feedback from a plurality of auditors, wherein the auditor feedback comprises one or more terms entered by one or more of the auditors to filter a set of items in a particular classification of the primary classification or one of the secondary classifications to obtain a narrower set of the items in the particular classification; and
   modify the particular classification, or generate a different classification, based at least in part on automated analysis of the auditor feedback, including the one or more terms entered by the one or more auditors to filter the set of items in the particular classification to obtain the narrower set of the items in the particular classification.

2. The system as recited in claim 1, wherein the automated statistical analysis of the frequency of occurrence of the plurality of terms is based at least in part on a relative frequency count of individual ones of the terms, and wherein a plurality of classifications in the hierarchical taxonomy, including the primary classification and the secondary classifications, are ordered from generic to specific.

3. The system as recited in claim 1, wherein, in modifying the primary classification or one of the secondary classifications, or in generating a different classification, the automated taxonomy generation system is configured to:
   determine, based at least in part on the auditor feedback, that the set of items is a narrow grouping, wherein the auditor feedback comprises a quantity of terms entered to filter the set of items, and wherein the quantity of terms is less than a threshold quantity; and
   generate a broader classification for the hierarchical taxonomy based at least in part on broadening the narrow grouping.

4. The system as recited in claim 1, wherein, in modifying the primary classification or one of the secondary classifications, or in generating a different classification, the automated taxonomy generation system is configured to:
   determine, based at least in part on the auditor feedback, that the set of items is a broad grouping, wherein the auditor feedback comprises a quantity of terms entered to filter the set of items, and wherein the quantity of terms is greater than a threshold quantity; and
   generate a narrower classification for the hierarchical taxonomy based at least in part on narrowing the broad grouping.

5. A computer-implemented method, comprising:
   determining a primary classification for a hierarchical taxonomy of items in a marketplace, wherein the primary classification is selected from a plurality of terms describing a plurality of items in the marketplace, and wherein the primary classification is selected based at least in part on automated analysis of a frequency of occurrence of the plurality of terms;
   determining a plurality of secondary classifications for the hierarchical taxonomy of items in the marketplace, wherein the secondary classifications are beneath the primary classification in the hierarchical taxonomy, wherein the secondary classifications are selected from the plurality of terms describing the plurality of items in the marketplace, and wherein the secondary classifications are selected based at least in part on automated analysis of the frequency of occurrence of the plurality of terms;
   generating, for a user of the marketplace, an interactive page comprising data indicative of a set of items in the primary classification or a set of items in one of the secondary classifications; and
   modifying a particular classification of the primary classification or one of the secondary classifications, or generating a different classification, based at least in part on feedback from a plurality of users, wherein the feedback comprises one or more terms entered by one or more of the users to filter a set of items in the particular classification to obtain a narrower set of the items in the particular classification.

6. The method as recited in claim 5, wherein the automated analysis of the frequency of occurrence of the plurality of terms is based at least in part on a relative frequency count of individual ones of the terms, wherein the secondary classifications occur less frequently than the primary classification in the plurality of terms, and wherein a plurality of classifications in the hierarchical taxonomy, including the primary classification and the secondary classifications, are ordered from generic to specific.

7. The method as recited in claim 5, wherein modifying the primary classification or one of the secondary classifications, or generating a different classification, further comprises:

determining, based at least in part on the feedback from the plurality of users, that the set of items is a narrow grouping, wherein the feedback comprises a quantity of terms entered to filter the set of items, and wherein the quantity of terms is less than a threshold quantity; and generating a broader classification for the hierarchical taxonomy based at least in part on broadening the narrow grouping.

8. The method as recited in claim 5, wherein modifying the primary classification or one of the secondary classifications, or generating a different classification, further comprises:

determining, based at least in part on the feedback from the plurality of users, that the set of items is a broad grouping, wherein the feedback comprises a quantity of terms entered to filter the set of items, and wherein the quantity of terms is greater than a threshold quantity; and generating a narrower classification for the hierarchical taxonomy based at least in part on narrowing the broad grouping.

9. The method as recited in claim 5, further comprising: generating a plurality of hierarchical taxonomies of items in the marketplace, wherein the plurality of hierarchical taxonomies of items in the marketplace are generated based at least in part on the feedback from the plurality of users, and wherein individual ones of the plurality of hierarchical taxonomies differ for respective groups of users or for respective marketplace regions.

10. The method as recited in claim 5, further comprising: sending, to one or more auditors, a plurality of sets of items, wherein the sets of items include a plurality of homogeneous sets and at least one heterogeneous set; and receiving, from the one or more auditors, one or more item grouping definitions for individual ones of the plurality of sets of items.

11. The method as recited in claim 5, further comprising: partitioning the plurality of items into a plurality of disjoint sets, wherein individual ones of the items are assigned to respective ones of the disjoint sets based on a frequency analysis of individual ones of the terms describing the plurality of items in the marketplace; and determining an estimated homogeneity for respective ones of the disjoint sets.

12. A computer-readable storage medium storing program instructions computer-executable to perform:

determining a primary classification for a hierarchical taxonomy of items in a marketplace, wherein the primary classification is selected from a plurality of terms describing a plurality of items in the marketplace, and wherein the primary classification is selected based at least in part on automated analysis of a frequency of occurrence of the plurality of terms;

determining a plurality of secondary classifications for the hierarchical taxonomy of items in the marketplace, wherein the secondary classifications are beneath the primary classification in the hierarchical taxonomy, wherein the secondary classifications are selected from the plurality of terms describing the plurality of items in the marketplace, and wherein the secondary classifications are selected based at least in part on automated analysis of the frequency of occurrence of the plurality of terms;

collecting feedback from a plurality of auditors, wherein the feedback comprises one or more terms entered by one or more of the auditors to filter a set of items in a particular classification of the primary classification or one of the secondary classifications to obtain a narrower set of the items in the particular classification; and modifying the particular classification, or generating a different classification, based at least in part on the feedback, including the one or more terms entered by the one or more auditors to filter the set of items in the particular classification to obtain the narrower set of the items in the particular classification.

13. The computer-readable storage medium as recited in claim 12, wherein the automated analysis of the frequency of occurrence of the plurality of terms is based at least in part on a relative frequency count of individual ones of the terms, wherein the secondary classifications occur less frequently than the primary classification in the plurality of terms, and wherein a plurality of classifications in the hierarchical taxonomy, including the primary classification and the secondary classifications, are ordered from generic to specific.

14. The computer-readable storage medium as recited in claim 12, wherein modifying the primary classification or one of the secondary classifications, or generating a different classification, further comprises:

determining, based at least in part on the feedback from the plurality of auditors, that the set of items is a narrow grouping, wherein the feedback comprises a quantity of terms entered to filter the set of items in the particular classification, and wherein the quantity of terms is less than a threshold quantity; and generating a broader classification for the hierarchical taxonomy based at least in part on broadening the narrow grouping.

15. The computer-readable storage medium as recited in claim 12, wherein modifying the primary classification or one of the secondary classifications, or generating a different classification, further comprises:

determining, based at least in part on the feedback from the plurality of auditors, that the set of items is a broad grouping, wherein the feedback comprises a quantity of terms entered to filter the set of items, and wherein the quantity of terms is greater than a threshold quantity; and generating a narrower classification for the hierarchical taxonomy based at least in part on narrowing the broad grouping.

16. The computer-readable storage medium as recited in claim 12, wherein the program instructions are further computer-executable to perform:

generating a plurality of hierarchical taxonomies of items in the marketplace, wherein the plurality of hierarchical taxonomies of items in the marketplace are generated based at least in part on the feedback from the plurality of auditors, and wherein individual ones of the plurality of hierarchical taxonomies differ for respective groups of users or for respective marketplace regions.

17. The computer-readable storage medium as recited in claim 12, wherein the program instructions are further computer-executable to perform:

generating, for a user of the marketplace, an interactive page comprising data indicative of a set of items in the primary classification or a set of items in one of the secondary classifications.

18. The computer-readable storage medium as recited in claim 12, wherein the program instructions are further computer-executable to perform:
   sending, to one or more of the auditors, a plurality of sets of items, wherein the sets of items include a plurality of homogeneous sets and at least one heterogeneous set; and
   receiving, from the one or more of the auditors, one or more item grouping definitions for individual ones of the plurality of sets of items.

19. The computer-readable storage medium as recited in claim 12, wherein the program instructions are further computer-executable to perform:
   partitioning the plurality of items into a plurality of disjoint sets, wherein individual ones of the items are assigned to respective ones of the disjoint sets based on a frequency analysis of individual ones of the terms describing the plurality of items in the marketplace; and
   determining an estimated homogeneity for respective ones of the disjoint sets.

* * * * *